(12) United States Patent
Xu et al.

(10) Patent No.: US 12,520,131 B2
(45) Date of Patent: Jan. 6, 2026

(54) METHOD, APPARATUS AND COMPUTER PROGRAM

(71) Applicant: Nokia Technologies Oy, Espoo (FI)

(72) Inventors: Xiang Xu, Suzhou (CN); Ilkka Antero Keskitalo, Oulu (FI); Matti Einari Laitila, Oulu (FI); Jens Gebert, Oberstenfeld (DE)

(73) Assignee: Nokia Technologies Oy, Espoo (FI)

( * ) Notice: Subject to any disclaimer, the term of this patent is extended or adjusted under 35 U.S.C. 154(b) by 367 days.

(21) Appl. No.: 18/272,377

(22) PCT Filed: Jan. 14, 2021

(86) PCT No.: PCT/CN2021/071884
§ 371 (c)(1),
(2) Date: Jul. 14, 2023

(87) PCT Pub. No.: WO2022/151233
PCT Pub. Date: Jul. 21, 2022

(65) Prior Publication Data
US 2024/0314546 A1    Sep. 19, 2024

(51) Int. Cl.
*H04W 8/26*        (2009.01)
*H04W 12/043*      (2021.01)
(Continued)

(52) U.S. Cl.
CPC .......... *H04W 8/26* (2013.01); *H04W 12/043* (2021.01); *H04W 36/0033* (2013.01); *H04W 36/08* (2013.01)

(58) Field of Classification Search
CPC . H04W 8/26; H04W 12/043; H04W 36/0033; H04W 36/08; H04W 36/00
See application file for complete search history.

(56) References Cited

U.S. PATENT DOCUMENTS 11,452,008 B2 * 9/2022 Yuh-Ren ............. H04W 12/043
2020/0314701 A1 * 10/2020 Talebi Fard .......... H04W 36/08
(Continued)

FOREIGN PATENT DOCUMENTS

CN    111901817 A    11/2020
CN    112039944 A    12/2020
(Continued)

OTHER PUBLICATIONS

Chatzimiltis, Sotiris, et al. "A collaborative software defined network-based smart grid intrusion detection system." IEEE open journal of the Communications Society 5 (2024): 700-711. (Year: 2024).*
(Continued)

*Primary Examiner* — Sharad Rampuria
(74) *Attorney, Agent, or Firm* — McCarter & English LLP

(57) ABSTRACT

There is provided an apparatus, said apparatus including circuitry for, at a distributed unit of a relay node, determining that an internet protocol, IP, address of the distributed unit of the relay node used for communicating with a centralised unit of a donor node over a first communication path including a first donor distributed unit is to be reused after a change from the first communication path to a second communication path including a second donor distributed unit and providing an indication to the control plane of the centralised unit of the donor node that the IP address is to be reused.

16 Claims, 13 Drawing Sheets

Four-way handshake

(51) Int. Cl.
*H04W 36/00* (2009.01)
*H04W 36/08* (2009.01)

(56) References Cited

U.S. PATENT DOCUMENTS

2021/0084554 A1* 3/2021 Chen ................. H04W 36/1443
2023/0209622 A1 6/2023 Teyeb et al. ..................... 76/12

FOREIGN PATENT DOCUMENTS

| CN | 112088544 A | 12/2020 |
| CN | 112868254 A | 5/2021 |
| WO | WO 2020/039400 A1 | 2/2020 |
| WO | WO 2020/243339 A1 | 12/2020 |

OTHER PUBLICATIONS

"IP address management during the IAB migration", Samsung, 3GPP TSG-RAN WG3 Meeting #105bil, R3-195001, Oct. 2019, 9 pages.
"IPv6 Flow Labels with IPsec", Nokia, Nokia Shanghai Bell, 3GPP TSG-WG3 meeting #104, R3-192800, May 2019, 4 pages.
3GPP, "Summary of Rel-16 Work Items (Release 16)," TR 21.916 V1.0.0, 3$^{rd}$ Generation Partnership Project; Technical Specification Group Services and System Aspects; Release 16 Description, Dec. 2020.

* cited by examiner

Figure 10

S1: At a distributed unit of a relay node, determining that an internet protocol, IP, address of the distributed unit of the relay node used for communicating with a centralised unit of a donor node over a first communication path comprising a first donor distributed unit is to be reused after a change from the first communication path to a second communication path comprising a second donor distributed unit S2: Providing an indication to the control plane of the centralised unit of the donor node that the IP address is to be reused

METHOD, APPARATUS AND COMPUTER PROGRAM

CROSS REFERENCE TO RELATED APPLICATION

This patent application is a U.S. National Stage application of International Patent Application Number PCT/CN2021/071884 filed Jan. 14, 2021, which is hereby incorporated by reference in its entirety.

FIELD

The present application relates to a method, apparatus, system and computer program and in particular but not exclusively to inter-donor Distributed Unit (DU) topology adaptation in integrated access and backhaul (IAB) communication.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers. In carrier aggregation (CA) two or more carriers are combined into one channel. In dual connectivity (DC), two carriers from different sites are combined, that is a user equipment may be dual (or multi) connected to two (or more) sites.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

IAB has been introduced in Release 16 (Rel-16) of 3GPP specifications as a key enabler for fast and cost-efficient deployments. IAB nodes use the same or different spectrum and air interface for access and backhaul, creating a hierarchical wireless multi-hop (multiple backhaul links) network between sites. The hops eventually terminate at an IAB donor that is connected by means of a conventional fixed backhaul to the core network. An IAB node contains a mobile termination (MT) part that acts as user equipment (UE) towards its parent distributed unit (DU), and a DU part that acts as a base station towards the mobile terminal and/or the child IAB node. An IAB donor contains a central unit (CU) part and a DU part. An IAB DU can provide one or more cells to serve UEs. In some cases, one IAB node may connect with more than one IAB donor. Therefore, traffic may be routed among IAB donors.

SUMMARY

In a first aspect there is provided an apparatus, said apparatus comprising means for, at a distributed unit of a relay node, determining that an internet protocol, IP, address of the distributed unit of the relay node used for communicating with a centralised unit of a donor node over a first communication path comprising a first donor distributed unit is to be reused after a change from the first communication path to a second communication path comprising a second donor distributed unit and providing an indication to the control plane of the centralised unit of the donor node that the IP address is to be reused.

The internet protocol address may be an inner internet protocol address when Internet Protocol Security, IPSec, tunnel mode is used to protect the traffic between the distributed unit of the relay node and the centralised unit of the donor node.

The distributed unit of the relay node may use the IP address with a first outer IP address anchored in the first donor distributed unit, when the distributed unit of the relay node is in communication with the centralised unit of the donor node over the first communication path.

The distributed unit of the relay node may use the IP address with a second outer IP address anchored in the second donor distributed unit, when the distributed unit of the relay node is in communication with the centralised unit of the donor node over the second communication path.

Means for determining that the IP address of the distributed unit of a relay node in communication with the centralised unit of the donor node is to be reused may comprise means for determining that the relay node is assigned with a new outer IP address anchored in the second donor distributed unit and a mobility internet key exchange procedure (e.g., Internet Key Exchange version 2 Mobility and Multihoming Protocol (MOBIKE)) to protect the traffic between the distributed unit and the centralised unit of the donor node has been performed, after the communication path is changed to the second communication path.

The apparatus may comprise means for causing transmission of the indication to the centralised unit of the donor node using the IP address over the second communication path comprising the second donor distributed unit.

The apparatus may comprise means for providing the indication in a F1 application protocol distributed unit configuration update message.

In a second aspect there is provided an apparatus comprising means for receiving an indication, at a control plane of a centralised unit of a donor node from a distributed unit of a relay node that an internet protocol address of the distributed unit of the relay node is to be reused for communication with the centralised unit donor node, after a communication path between the distributed unit of the relay node and the centralised unit of the donor node is changed from a first communication path comprising a first donor distributed unit, to a second communication path comprising a second donor distributed unit and causing traffic transmission between the distributed unit of the relay node and the centralised unit of the donor node using the IP address over the second communication path.

The internet protocol address may be the inner internet protocol address when Internet Protocol Security, IPSec, tunnel mode is used to protect the traffic between the distributed unit of the relay node and the centralised unit of the donor node.

The distributed unit of the relay node may use the IP address with a first outer IP address anchored in the first donor distributed unit, when the distributed unit of the relay node is in communication with the centralised unit of the donor node over the first communication path.

The distributed unit of the relay node may use the IP address with a second outer IP address anchored in the second donor distributed unit, when the distributed unit of the relay node is in communication with the centralised unit of the donor node over the second communication path.

The apparatus may comprise means for initiating a handover procedure or a retrieve user equipment context procedure for a user equipment or a descendant relay node, to use the second communication path.

The apparatus may comprise means for providing an indication to the user plane of the centralised unit of the donor node to resume the traffic transmission using the internet protocol address of the distributed unit of the relay node.

In a third aspect there is provided a method comprising a at a distributed unit of a relay node, determining that an internet protocol, IP, address of the distributed unit of the relay node used for communicating with a centralised unit of a donor node over a first communication path comprising a first donor distributed unit is to be reused after a change from the first communication path to a second communication path comprising a second donor distributed unit and providing an indication to the control plane of the centralised unit of the donor node that the IP address is to be reused.

The internet protocol address may be an inner internet protocol address when Internet Protocol Security, IPSec, tunnel mode is used to protect the traffic between the distributed unit of the relay node and the centralised unit of the donor node.

The distributed unit of the relay node may use the IP address with a first outer IP address anchored in the first donor distributed unit, when the distributed unit of the relay node is in communication with the centralised unit of the donor node over the first communication path.

The distributed unit of the relay node may use the IP address with a second outer IP address anchored in the second donor distributed unit, when the distributed unit of the relay node is in communication with the centralised unit of the donor node over the second communication path.

Determining that the IP address of the distributed unit of a relay node in communication with the centralised unit of the donor node is to be reused may comprise determining that the relay node is assigned with a new outer IP address anchored in the second donor distributed unit and a mobility internet key exchange (e.g., Internet Key Exchange version 2 Mobility and Multihoming Protocol (MOBIKE)) procedure to protect the traffic between the distributed unit and the centralised unit of the donor node has been performed, after the communication path is changed to the second communication path.

The method may comprise causing transmission of the indication to the centralised unit of the donor node using the IP address over the second communication path comprising the second donor distributed unit.

The method may comprise providing the indication in a F1 application protocol distributed unit configuration update message.

In a fourth aspect there is provided a method comprising receiving an indication, at a control plane of a centralised unit of a donor node from a distributed unit of a relay node that an internet protocol address of the distributed unit of the relay node is to be reused for communication with the centralised unit donor node, after a communication path between the distributed unit of the relay node and the centralised unit of the donor node is changed from a first communication path comprising a first donor distributed unit, to a second communication path comprising a second donor distributed unit and causing traffic transmission between the distributed unit of the relay node and the centralised unit of the donor node using the IP address over the second communication path.

The internet protocol address may be the inner internet protocol address when Internet Protocol Security, IPSec, tunnel mode is used to protect the traffic between the distributed unit of the relay node and the centralised unit of the donor node.

The distributed unit of the relay node may use the IP address with a first outer IP address anchored in the first donor distributed unit, when the distributed unit of the relay node is in communication with the centralised unit of the donor node over the first communication path.

The distributed unit of the relay node may use the IP address with a second outer IP address anchored in the second donor distributed unit, when the distributed unit of the relay node is in communication with the centralised unit of the donor node over the second communication path.

The method may comprise initiating a handover procedure or a retrieve user equipment context procedure for a user equipment or a descendant relay node, to use the second communication path.

The method may comprise providing an indication to the user plane of the centralised unit of the donor node to resume the traffic transmission using the internet protocol address of the distributed unit of the relay node.

In a fifth aspect there is provided an apparatus comprising at least one processor and at least one memory including a computer program code, the at least one memory and computer program code configured to, with the at least one processor, cause the apparatus at least to, at a distributed unit of a relay node, determine that an internet protocol, IP, address of the distributed unit of the relay node used for communicating with a centralised unit of a donor node over a first communication path comprising a first donor distributed unit is to be reused after a change from the first communication path to a second communication path comprising a second donor distributed unit and provide an indication to the control plane of the centralised unit of the donor node that the IP address is to be reused.

The internet protocol address may be an inner internet protocol address when Internet Protocol Security, IPSec, tunnel mode is used to protect the traffic between the distributed unit of the relay node and the centralised unit of the donor node.

The distributed unit of the relay node may use the IP address with a first outer IP address anchored in the first donor distributed unit, when the distributed unit of the relay node is in communication with the centralised unit of the donor node over the first communication path.

The distributed unit of the relay node may use the IP address with a second outer IP address anchored in the second donor distributed unit, when the distributed unit of the relay node is in communication with the centralised unit of the donor node over the second communication path.

The apparatus may be configured to determine that that the relay node is assigned with a new outer IP address anchored in the second donor distributed unit and a mobility internet key exchange (e.g., Internet Key Exchange version 2 Mobility and Multihoming Protocol (MOBIKE)) procedure to protect the traffic between the distributed unit and the centralised unit of the donor node has been performed, after the communication path is changed to the second communication path.

The apparatus may be configured to cause transmission of the indication to the centralised unit of the donor node using the IP address over the second communication path comprising the second donor distributed unit.

The apparatus may be configured to provide the indication in a F1 application protocol distributed unit configuration update message.

In a sixth aspect there is provided an apparatus comprising: at least one processor and at least one memory including a computer program code, the at least one memory and computer program code configured to, with the at least one processor, cause the apparatus at least to receive an indication, at a control plane of a centralised unit of a donor node from a distributed unit of a relay node that an internet protocol address of the distributed unit of the relay node is to be reused for communication with the centralised unit donor node, after a communication path between the distributed unit of the relay node and the centralised unit of the donor node is changed from a first communication path comprising a first donor distributed unit, to a second communication path comprising a second donor distributed unit and cause traffic transmission between the distributed unit of the relay node and the centralised unit of the donor node using the IP address over the second communication path.

The internet protocol address may be the inner internet protocol address when Internet Protocol Security, IPSec, tunnel mode is used to protect the traffic between the distributed unit of the relay node and the centralised unit of the donor node.

The distributed unit of the relay node may use the IP address with a first outer IP address anchored in the first donor distributed unit, when the distributed unit of the relay node is in communication with the centralised unit of the donor node over the first communication path.

The distributed unit of the relay node may use the IP address with a second outer IP address anchored in the second donor distributed unit, when the distributed unit of the relay node is in communication with the centralised unit of the donor node over the second communication path.

The apparatus may be configured to initiate a handover procedure or a retrieve user equipment context procedure for a user equipment or a descendant relay node, to use the second communication path.

The apparatus may be configured to provide an indication to the user plane of the centralised unit of the donor node to resume the traffic transmission using the internet protocol address of the distributed unit of the relay node.

In a seventh aspect there is provided a computer readable medium comprising program instructions for causing an apparatus to perform at least the following, at a distributed unit of a relay node, determining that an internet protocol, IP, address of the distributed unit of the relay node used for communicating with a centralised unit of a donor node over a first communication path comprising a first donor distributed unit is to be reused after a change from the first communication path to a second communication path comprising a second donor distributed unit and providing an indication to the control plane of the centralised unit of the donor node that the IP address is to be reused.

The internet protocol address may be an inner internet protocol address when Internet Protocol Security, IPSec, tunnel mode is used to protect the traffic between the distributed unit of the relay node and the centralised unit of the donor node.

The distributed unit of the relay node may use the IP address with a first outer IP address anchored in the first donor distributed unit, when the distributed unit of the relay node is in communication with the centralised unit of the donor node over the first communication path.

The distributed unit of the relay node may use the IP address with a second outer IP address anchored in the second donor distributed unit, when the distributed unit of the relay node is in communication with the centralised unit of the donor node over the second communication path.

Determining that the IP address of the distributed unit of a relay node in communication with the centralised unit of the donor node is to be reused may comprise determining that the relay node is assigned with a new outer IP address anchored in the second donor distributed unit and a mobility internet key exchange (e.g., Internet Key Exchange version 2 Mobility and Multihoming Protocol (MOBIKE)) procedure to protect the traffic between the distributed unit and the centralised unit of the donor node has been performed, after the communication path is changed to the second communication path.

The apparatus may be caused to perform causing transmission of the indication to the centralised unit of the donor node using the IP address over the second communication path comprising the second donor distributed unit.

The apparatus may be caused to perform providing the indication in a F1 application protocol distributed unit configuration update message.

In an eighth aspect there is provided a computer readable medium comprising program instructions for causing an apparatus to perform at least the following receiving an indication, at a control plane of a centralised unit of a donor node from a distributed unit of a relay node that an internet protocol address of the distributed unit of the relay node is to be reused for communication with the centralised unit donor node, after a communication path between the distributed unit of the relay node and the centralised unit of the donor node is changed from a first communication path comprising a first donor distributed unit, to a second communication path comprising a second donor distributed unit and causing traffic transmission between the distributed unit of the relay node and the centralised unit of the donor node using the IP address over the second communication path.

The internet protocol address may be the inner internet protocol address when Internet Protocol Security, IPSec, tunnel mode is used to protect the traffic between the distributed unit of the relay node and the centralised unit of the donor node.

The distributed unit of the relay node may use the IP address with a first outer IP address anchored in the first donor distributed unit, when the distributed unit of the relay node is in communication with the centralised unit of the donor node over the first communication path.

The distributed unit of the relay node may use the IP address with a second outer IP address anchored in the second donor distributed unit, when the distributed unit of the relay node is in communication with the centralised unit of the donor node over the second communication path.

The apparatus may be caused to perform initiating a handover procedure or a retrieve user equipment context procedure for a user equipment or a descendant relay node, to use the second communication path.

The apparatus may be caused to perform providing an indication to the user plane of the centralised unit of the donor node to resume the traffic transmission using the internet protocol address of the distributed unit of the relay node.

In a ninth aspect there is provided a non-transitory computer readable medium comprising program instructions for causing an apparatus to perform at least the method according to the third aspect or a method according to the fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 10 shows a flowchart of a method according to an example embodiment;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G System (5GS). Network architecture in 5GS may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches.

5G networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts.

Figure 1:
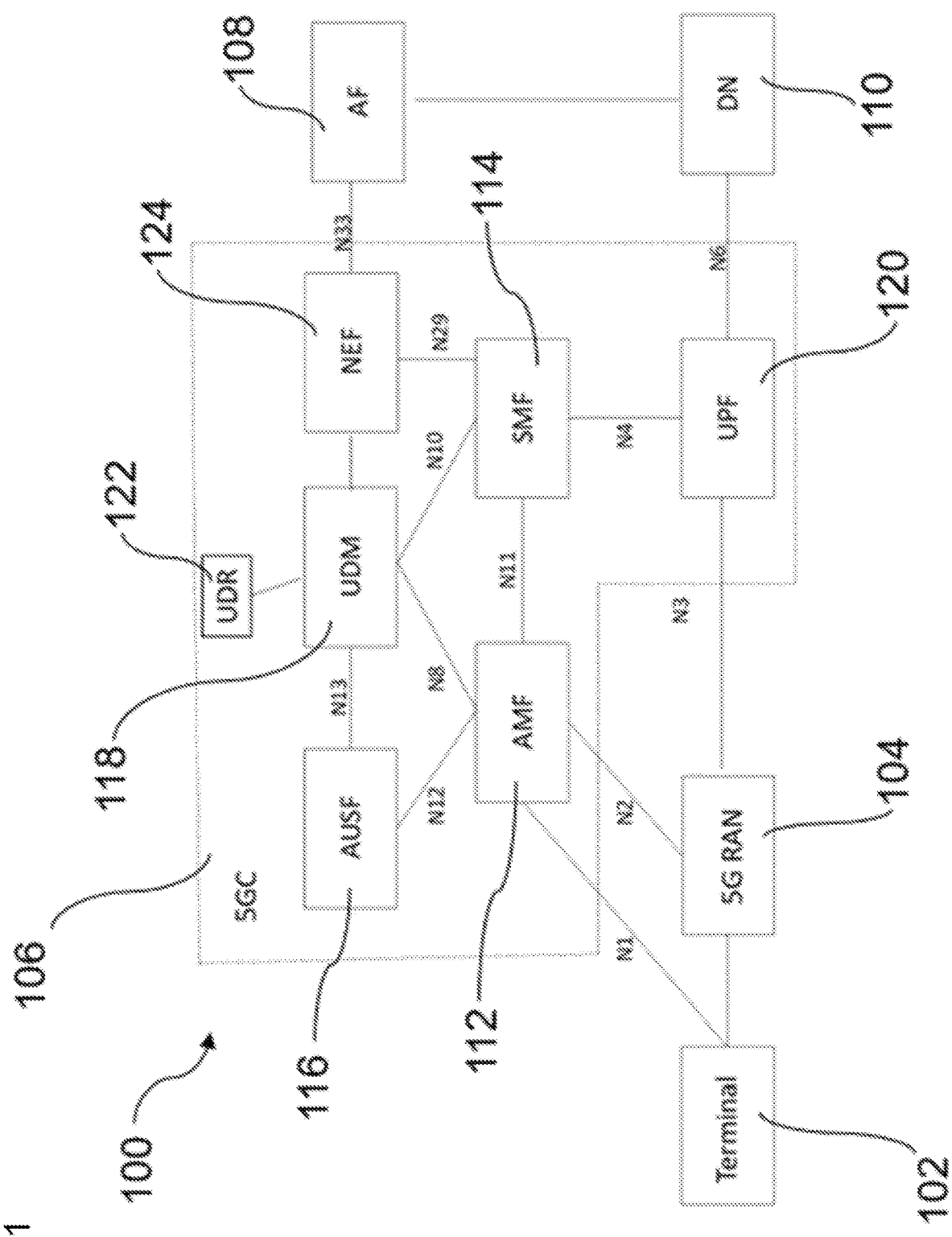
FIG. 1 shows a schematic diagram of an example communication system.

FIG. 1 shows a schematic representation of a 5G system (5GS) 100. The 5GS may comprise a user equipment (UE) 102 (which may also be referred to as a communication device or a terminal), a 5G radio access network (5GRAN) 104, a 5G core network (5GCN) 106, one or more application functions (AF) 108 and one or more data networks (DN) 110.

An example 5G core network (CN) comprises functional entities. The 5GCN 106 may comprise one or more access and mobility management functions (AMF) 112, one or more session management functions (SMF) 114, an authentication server function (AUSF) 116, a unified data management (UDM) 118, one or more user plane functions (UPF) 120, a unified data repository (UDR) 122 and/or a network exposure function (NEF) 124. The UPF is controlled by the SMF (Session Management Function) that receives policies from a PCF (Policy Control Function).

The CN is connected to a terminal device via the radio access network (RAN). The 5GRAN may comprise one or more gNodeB (gNB). A gNB may consist of a gNB centralized unit (CU) and one or more gNB distributed unit (DU). A gNB-CU and a gNB-DU are connected via a F1 interface. A gNB-CU may further consist of a gNB-CU-Control Plane (gNB-CU-CP), and one or more gNB-CU-User Planes (gNB-CU-UP).

A UPF (User Plane Function) whose role is called PSA (PDU Session Anchor) may be responsible for forwarding frames back and forth between the DN (data network) and the tunnels established over the 5G towards the UE(s) exchanging traffic with the DN.

Figure 2:
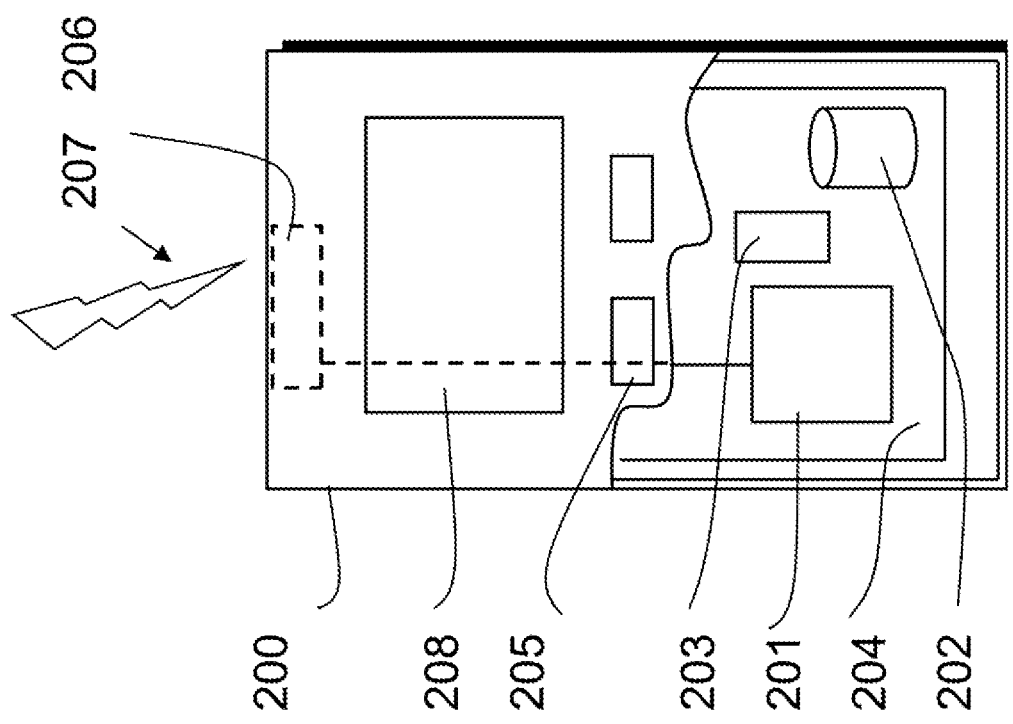
FIG. 2 shows a schematic diagram of an example 5GS mobile communication device.

A possible terminal device will now be described in more detail with reference to FIG. 2 showing a schematic, partially sectioned view of a communication device 200. Such a communication device is often referred to as user equipment (UE). An appropriate communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
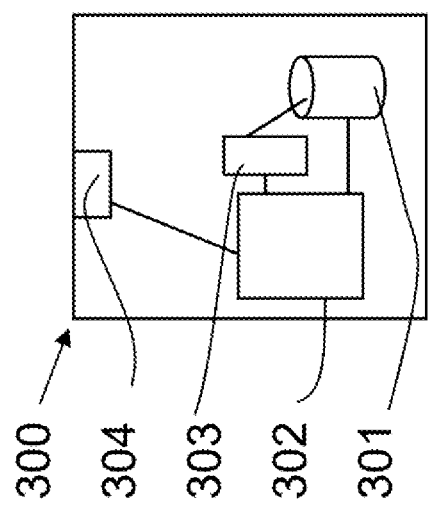
FIG. 3 shows a schematic diagram of an example control apparatus.

FIG. 3 shows an example embodiment of a control apparatus for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Figure 4:
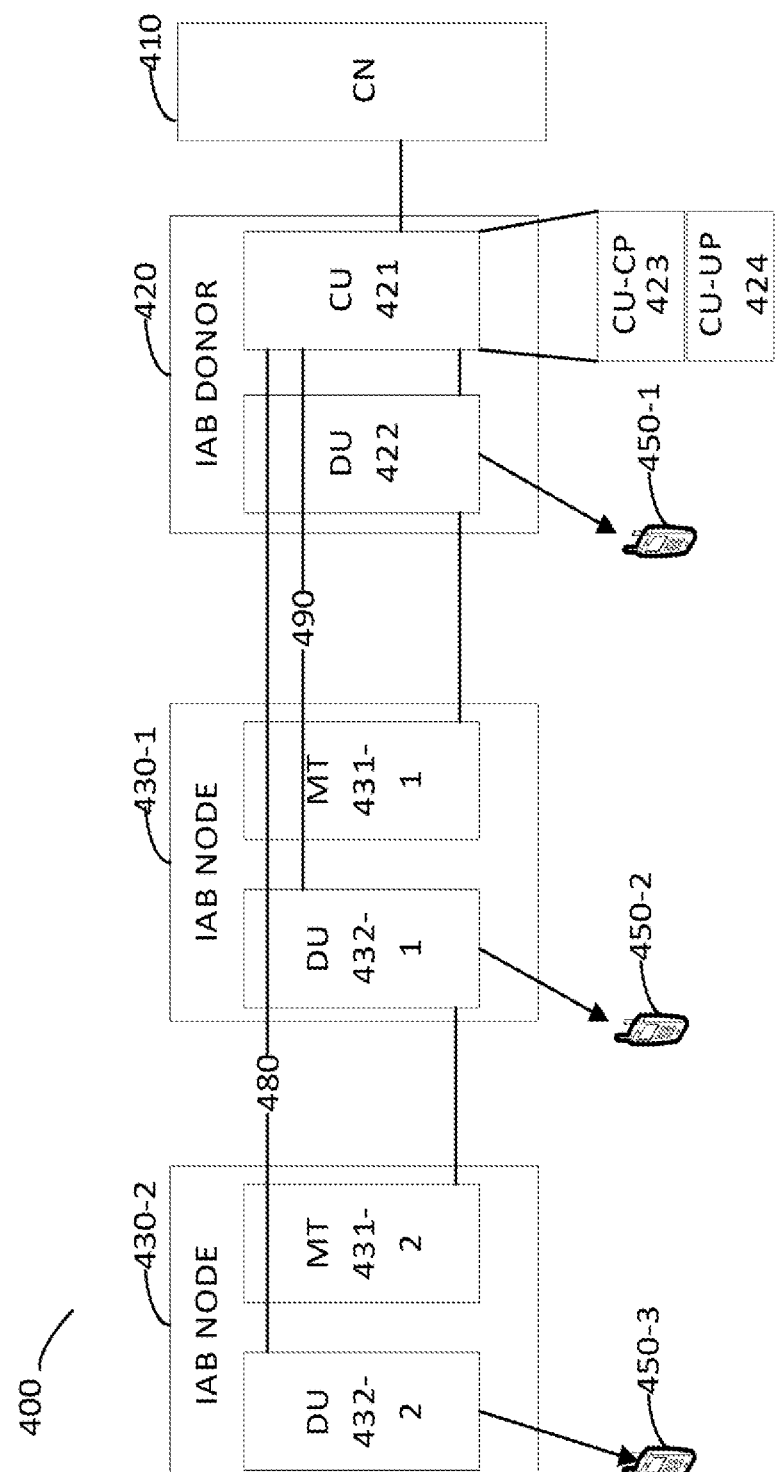
FIG. 4 shows a schematic diagram of an example IAB network architecture.

Rel. 16 3GPP specifications include a NR relaying option known as Integrated Access and Backhaul (IAB). The adopted solution is a L2 relay supporting multi-hop (multiple backhaul links) topologies. An example of an architecture for IAB is illustrated in FIG. 4.

In this architecture, the CN interfaces are terminated at the IAB-donor 420 and therefore the relaying is a RAN functionality. The solution leverages split gNB architecture for Centralized Unit (CU) and Distributed Unit (DU) so that the CU functions are at the IAB-donor 420 and the DU functions are at the IAB donor DU 422 or at the IAB node 430-1 or 430-2. For the connection setup and communication with the parent node (which may be another IAB node 430-1 or the IAB-donor 420), an IAB-node 430-1 or 430-2 hosts the MT function 431 corresponding to UE operation or a part of the UE operation.

The IAB-MT 430-1 or 430-2 may have dual connectivity, e.g. via DC or DAPS or multi-MT.

The IAB donor 420 may comprise a CU 421 (also referred to as "IAB donor CU 421") and a DU 422 (also referred to as "IAB donor DU 422"). It is to be understood that the CU 421 and DU 422 may be implemented in the same device, or in different devices. The CU 421 may further comprise a CU-Control Plane (CU-CP) 423, and one or more CU-User Plane (CU-UP) 424. It is to be understood that the CU-CP 423 and CU-UP 424 may be implemented in the same device, or in different devices. The IAB node 430-1 may comprise a MT part 431-1 and a DU 432-1. The IAB node 430-2 may comprise a MT part 431-2 and a DU 432-2. The MT parts 431-1 and 431-2 are also collectively referred to as "IAB MTs 431" or individually referred to as "IAB MT 431". The DUs 432-1 and 432-2 are also collectively referred to as "IAB DUs 432" or individually referred to as "IAB DU 432".

The IAB donor DU 422 or each IAB DU 432 can provide one or more cells to serve terminal devices and/or one or more IAB-MTs 431. For example, as shown in FIG. 4, the IAB donor DU 422 serves the terminal device 450-1 and IAB-MT 431-1, the IAB DU 432-1 serves the terminal device 450-2 and IAB-MT 431-2, and the IAB DU 432-2 serves the terminal device 450-3.

The IAB MT 431 of an IAB node 430 may act as a UE towards its parent node. For example, the IAB MT 431-1 may act as a UE towards the IAB donor 420 (i.e., the IAB donor DU 422) and the IAB MT 431-2 may act as a UE towards the IAB node 430-1 (i.e., the IAB DU 432-1). On the child links, the IAB DU 432 of an IAB node 430 may act as a network device (such as, gNB) towards the UE and its next-hop IAB node. For example, the IAB donor DU 422 may act as a gNB-DU towards the IAB node 430-1 and the IAB DU 432-1 may act as a gNB-DU towards the IAB node 430-2. On the access links, the IAB donor 420 and the IAB nodes 430 may act as normal network devices, providing radio interfaces for the terminal devices 450 in their coverage areas.

BH radio link control (RLC) channel(s) can be set up between the IAB MT 431 and a DU of the parent node and an adaptation layer called a Backhaul Adaptation Protocol (BAP) is agreed to be on top of a RLC layer. The IAB DU 432 connects to the IAB donor CU 421 with an F1 interface which supports IAB functions. For example, the IAB DU 432-1 connects to the IAB donor CU 421 via the F1 interface 190 and the IAB DU 432-2 connects to the IAB donor CU 421 via the F1 interface 180. The F1 interface may comprise a F1-C interface and a F1-U interface. The IAB DU 432 connects to the IAB Donor CU-CP 423 via the F1-C interface, and the IAB DU 432 connects to the IAB Donor CU-UP 424 via the F1-U interface. The F1 interface traffic includes the traffic of the F1-U interface (also referred to as "F1-U traffic") and the traffic of the F1-C interface (also referred to as "F1-C traffic"). The F1 interface traffic is transported on top of the adaptation layer. The IAB thus implements L2 relaying. To enable the downlink (DL) F1 traffic routed to the serving IAB donor DU 422 for the IAB node 430, the IAB node 430 is assigned with an Internet Protocol (IP) address(es) (e.g., outer IP address when IPSec tunnel is enabled) that is anchored in the IAB donor DU 422. When the IAB donor CU 421 sends the DL F1 traffic to the IAB node 430, the F1 traffic is routed to the IAB donor DU 422 based on the IP address. The IAB donor DU 422 maps the DL F1 traffic to a related BH RLC channel based on a configuration that is previously configured by the IAB donor CU 421. The configuration includes the differentiated services code point (DSCP) and/or Internet Protocol Version 6 (IPv6) Flow Label and/or IP address in order to identify the DL F1 traffic, as well as the related BH RLC channel information. This requires that the IAB donor CU 421 (e.g., donor CU-CP or donor CU-UP) uses specific DSCP and/or IPv6 Flow Label and/or IP address in order to support the traffic mapping in the IAB donor DU 422.

Moreover, during topology adaptation or migration, the serving IAB donor DU for an IAB node 430 may be changed from a source IAB donor DU (also referred to as a first donor DU) to a target IAB donor DU (also referred to as a second donor DU). Accordingly, the IAB node 430 may get a new IP address(es) that is anchored in the target IAB donor DU. When the IAB 430 node connects with the source parent cell, the communication path (for example, to be used for the F1 traffic) between the IAB node 430 and IAB donor CU 421 includes the source IAB donor DU, and the communication path is referred as the source path or the first communication path. After the topology adaptation, the IAB 430 node connects with the target parent cell. The communication path between the IAB node 430 and IAB donor CU 421 includes the target IAB donor DU, and the communication path is referred as the target path or the second communication path.

For the F1-C interface between the IAB node 430 (more specifically, the DU collocated in the IAB node 430) and IAB donor CU-CP 423, the Transport Network Layer is based on IP transport, comprising SCTP on top of IP. The IAB-DU initiates the SCTP establishment with the IAB donor CU-CP, before the IAB-DU initiates the F1 interface setup with the IAB donor CU-CP.

Figure 5A:
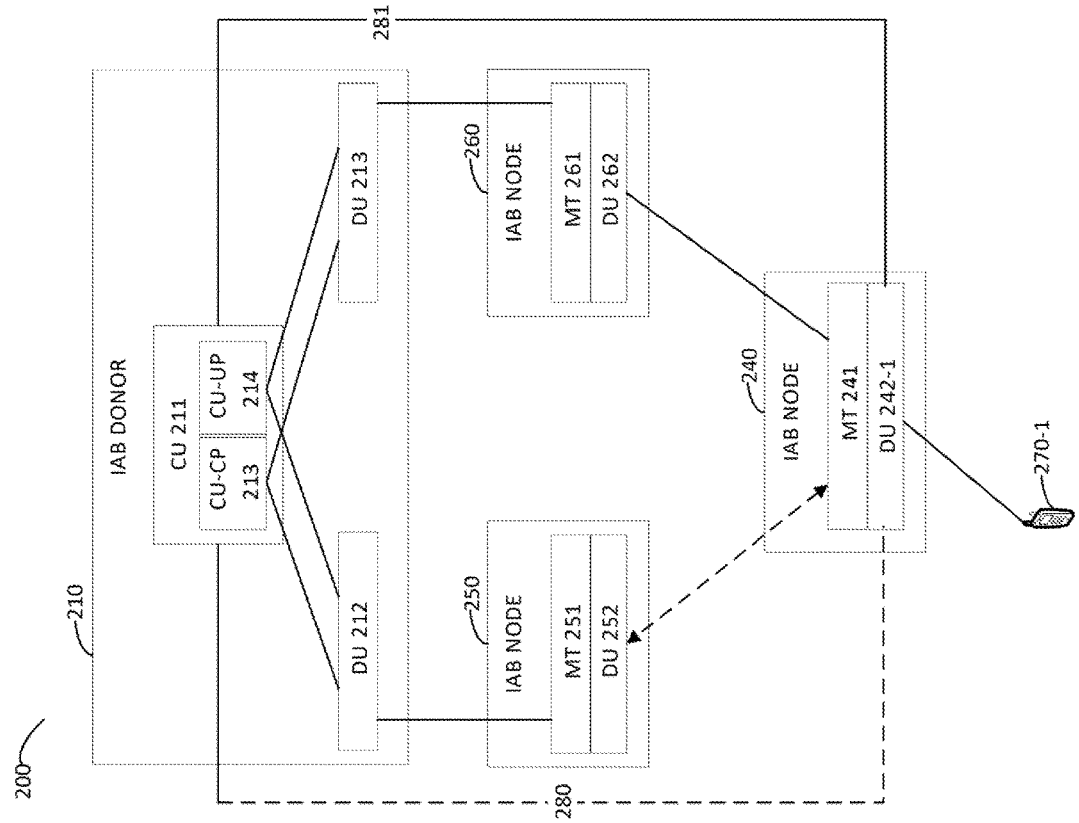
FIG. 5a and FIG. 5b illustrate example IAB environments in which embodiments of the present disclosure may be implemented.
Figure 5B:
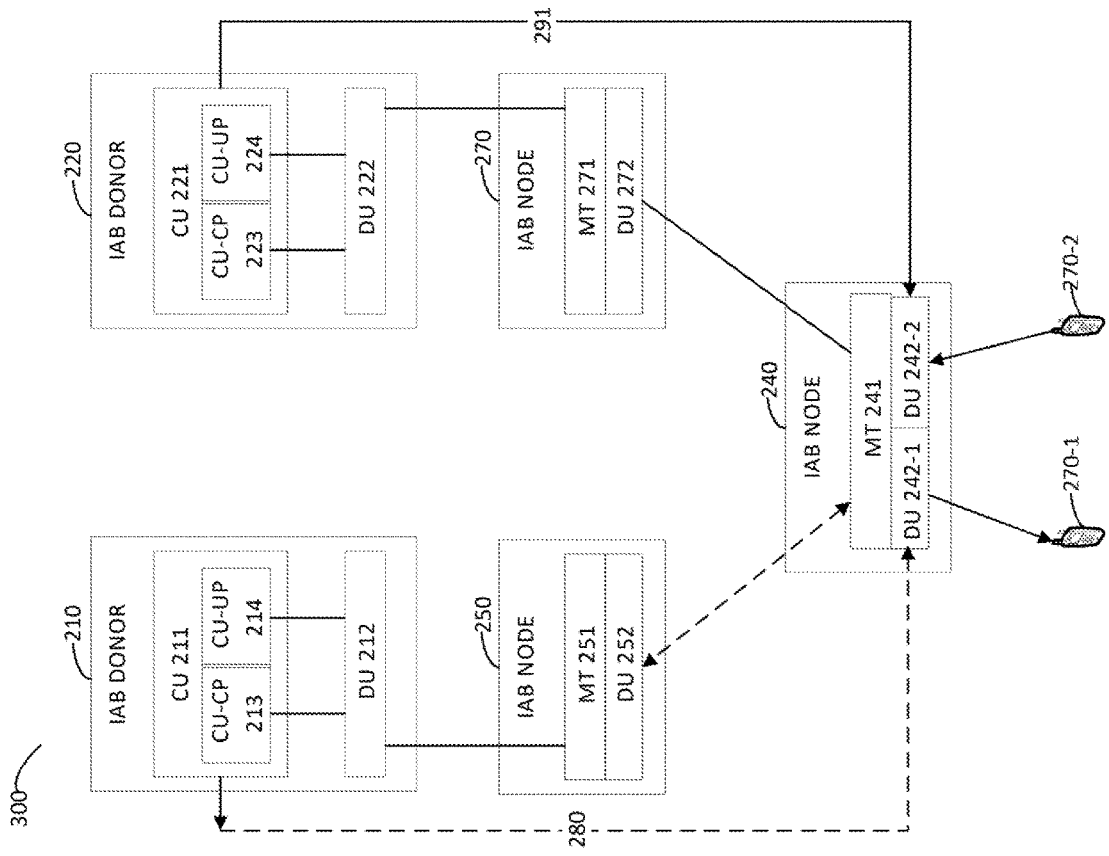

FIG. 5a and FIG. 5b illustrate example IAB environments 200 and 300 in which embodiments of the present disclosure can be implemented. As shown in FIG. 5a and FIG. 5b, the environments 200 and 300 comprise IAB donor 210 and IAB donor 220, an IAB node 250 (also referred as "source parent cell" or "source parent"), an IAB node 260 (also referred as "target parent cell" or "target parent"), an IAB node 240 and terminal devices 270-1 and 270-2 (collectively referred to as "terminal devices 270" or individually referred to as "terminal device 270").

The IAB donor 210 comprises a CU 211 (also referred to as "IAB donor CU 211" or "donor1 CU 211" in the following), a DU 212 (also referred to as source IAB donor DU in the following), and a DU 213 (also referred to as target IAB donor DU in the following description for FIG. 5a). The IAB donor CU 211 may comprises a CU-CP 213 and a CU-UP 214.

The IAB donor 220 comprises a CU 221 (also referred to as "IAB donor CU 221" or "donor2 CU 221" in the following) and a DU 222 (also referred to as target IAB donor DU in the following description for FIG. 5b). The IAB donor CU 221 may comprises a CU-CP 223 and a CU-UP 224.

The IAB node 250, which acts as an intermediate node between the IAB donor DU 212 and the IAB node 240, comprises a MT 251 and a DU 252. Likewise, the IAB node 260, which acts as an intermediate node between the IAB donor DU 213 and the IAB node 240, comprises a MT 261 and a DU 262. The IAB node 270, which acts as an intermediate node between the IAB donor 220 and the IAB node 240, comprises a MT 271 and a DU 272.

The IAB node 240 comprises a MT 241 (also referred to as "IAB MT 241" in the following) and at least one DU 242-1 (also referred to as "IAB DU 242-1" in the following). For example, as shown in FIG. 5b, in some example embodiments, the IAB node 240 may further comprise a DU 242-2 (also referred to as "IAB DU 242-2" in the following). The DUs 242-1 and 242-2 may be collectively referred to as "IAB DUs 242" or individually referred to as "IAB DU 242". It is to be understood that the number of DUs in the IAB node 240 shown in FIG. 5a and FIG. 5b is only for the purpose of illustration without suggesting any limitation to the scope of the present disclosure.

FIG. 5a shows an intra-Donor inter-Donor-DU topology adaptation scenario. The IAB node 240 is initially connected to the IAB node 250. The IAB node 240 is in communication with the IAB donor 210 via the intermediate IAB 250 and the IAB donor DU 212 (also referred as the first IAB donor DU, or the source IAB Donor DU in the following). The communication path including the IAB donor DU 212 and intermediate IAB 250 is referred as the first communication path or the source communication path in the following. The F1 traffic between the IAB-DU 242-1 and IAB donor CU 211 traverse over the first communication path. During a topology adaptation, the IAB node 240 migrates from the source IAB node 250 to the target IAB node 260 of the same IAB donor, but with a different IAB donor DU 213 (also referred as the second IAB donor DU, or the target IAB Donor DU in the following). The communication path including the IAB donor DU 213 and intermediate IAB 260 is referred as the second communication path or the target communication path in the following. Accordingly, the IAB node 240 is assigned with new outer IP address(es) anchored in the IAB Donor DU 213.

To protect the F1 traffic between the IAB DU (for example, DU 242-1) and the IAB donor (for example, CU 211), the IPSec tunnel is established between the IAB DU and the security gateway (SEG). The SEG and IAB donor may be implemented in the same or different devices.

As shown in FIG. 5a, before the topology adaptation, an IPSec tunnel, a SCTP association and a F1 interface 280 (including the F1-C interface and the F1-U interface) between the IAB DU 242 (for example, DU 242-1) and the IAB donor CU 211 are established, and a BH link between the IAB MT 241 and the DU 252 is also established. After topology adaptation, a new IPSec tunnel and new SCTP association 281 between the IAB DU 242 (for example, DU 242-1) and the IAB donor CU 221 are established, and a BH link between the IAB MT 241 and the DU 262 is also established. The F1 interface is migrated to target communication path. The F1 traffic between the IAB-DU 242-1 and IAB donor CU 211 traverse over the second communication path.

FIG. 5b shows an inter-Donor inter-Donor-DU topology redundancy scenario. The IAB node 240 is initially connected to the IAB node 250. The IAB node 240 is in communication with the IAB donor 210 via the intermediate IAB 250, and the IAB donor DU 212 (also referred as the first IAB donor DU, or the source IAB Donor DU in the following). The communication path including the IAB donor DU 212 and intermediate IAB 250 is referred as the first communication path or the source communication path in the following. The F1 traffic between the IAB-DU 242-1 and IAB donor CU 211 traverse over the first communication path. During a topology adaptation, the IAB node 240 migrates from the source IAB node 250 to the target IAB node 270 of a different IAB donor and a different IAB donor DU 222 (also referred as the second IAB donor DU, or the target IAB Donor DU in the following). The communication path including the IAB donor DU 222 and intermediate IAB 270 is referred as the second communication path or the target communication path in the following. Accordingly, the IAB node 240 is assigned with new outer IP address(es) anchored in the IAB Donor DU 222.

As shown in FIG. 5b, before the topology adaptation, an IPSec tunnel, a SCTP association and a F1 interface 280 (including the F1-C interface and the F1-U interface) between the IAB DU 242 (for example, DU 242-1) and the IAB donor CU 211 are established, and a BH link between the IAB MT 241 and the DU 252 is also established. After topology adaptation, a new IPSec tunnel, a new SCTP association and a new F1 interface 291 between the IAB DU 242 (for example, DU 242-1) and the IAB donor CU 221 are established, and a BH link between the IAB MT 241 and the DU 272 is also established. The F1 interface is migrated to target communication path. The F1 traffic between the IAB-DU 242-1 and IAB donor CU 211 traverse over the second communication path. In some embodiment, the IAB node 240 may have more than one IAB-DU, for example, the IAB-DU 242-1 and IAB-DU 242-2. Before the topology adaptation, the IAB-DU (for example, IAB-DU 242-2) may establish the SCTP association and F1 interface with IAB donor CU 221 over the first communication path. After the topology adaptation, the F1 interface between the IAB-DU 242-2 and IAB donor CU 221 is migrated to the second communication path. In some other embodiment, the F1 interface between the IAB-DU 242-1 and IAB donor CU 211 is migrated to the second communication path.

It is to be understood that the number of IAB donors, IAB nodes, and terminal devices connected to the IAB nodes is only for the purpose of illustration without suggesting any limitation to the scope of the present disclosure. It is also to be understood that the number of CUs, DUs and MTs is only for the purpose of illustration without suggesting any limitation to the scope of the present disclosure. The communication system may include any suitable number of IAB donors, IAB nodes, and terminal devices adapted for implementing example embodiments of the present disclosure. For example, in some example embodiments, the IAB node 240 may be directly connected to an IAB donor, e.g., the IAB donor 210 or 220. For another example, in some example embodiments, there may be more than one intermediate IAB node between the IAB node 240 and an IAB donor, e.g., the IAB donor 210 or 220. The transmission path via the DU 212 and optionally one or more intermediate IAB nodes (for example, IAB node 250) is referred to as a "first communication path" or "source path". The transmission path via the DU 213 or DU 222 and optionally one or more intermediate IAB nodes (for example, IAB node 260) is referred to as a "second communication path" or "target path".

Figure 6:
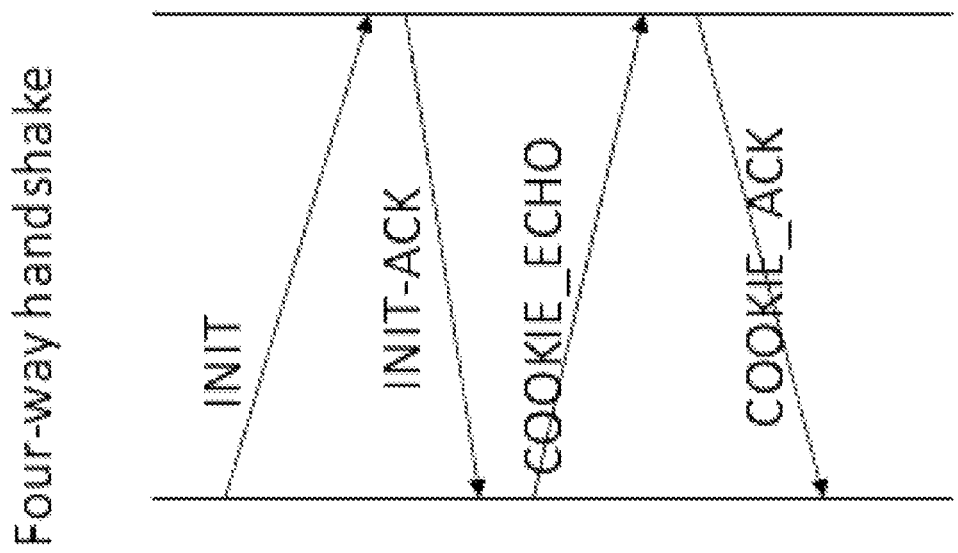
FIG. 6 shows an example signalling flow for a SCTP establishment procedure.

FIG. 6 shows an establishment procedure for Stream Control Transmission Protocol (SCTP) between a IAB node and the IAB donor CU-CP. The SCTP establishment procedure involves a 4-way handshake.

The IAB-DU (for example, DU 432-2) first sends an INIT chunk to the IAB donor-CU-CP 423. After sending the INIT, the IAB-DU starts the T1-init timer and enters the COOKIE-WAIT state.

The IAB donor-CU-CP (for example, CU-CP 423) shall respond with an INIT ACK chunk.

Upon reception of the INIT ACK from IAB donor-CU-CP (for example, CU-CP 423), the IAB DU (for example, DU 432-2) shall stop the T1-init timer and leave the COOKIE-WAIT state. The IAB DU shall then send the State Cookie received in the INIT ACK chunk in a COOKIE ECHO chunk, start the T1-cookie timer, and enter the COOKIE-ECHOED state.

Upon reception of the COOKIE ECHO chunk, the IAB donor-CU-CP (for example, CU-CP 423) will reply with a COOKIE ACK chunk and move to the ESTABLISHED state. The SCTP association is now established.

In order to protect the traffic on the F1-U interface, IP Security (IPSec) is mandatory to be implemented on the gNB-DU and on the gNB-CU. On the gNB-CU side, a security gateway (SEG) may be used to terminate the IPsec tunnel. IPsec ESP and IKEv2 certificates-based authentication shall be supported. IKEv2 Pre-shared Secret Key (PSK) authentication shall be supported.

Figure 7:
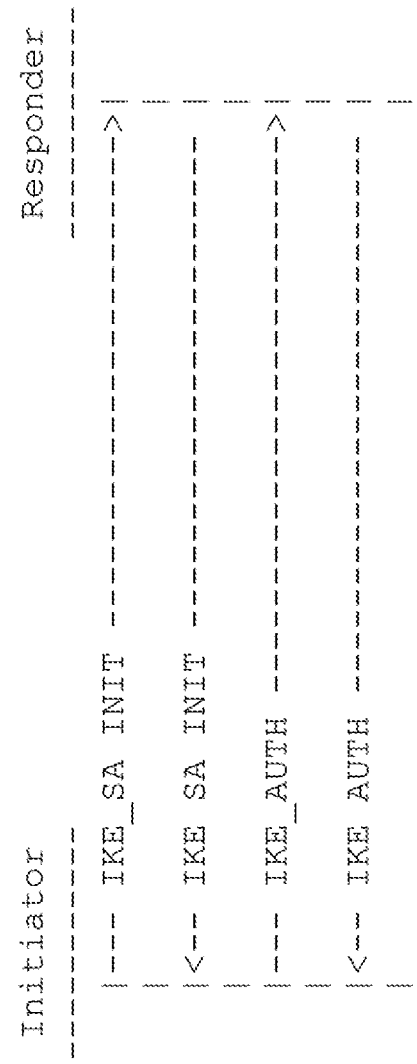
FIG. 7 shows an example signalling flow for an Internet Protocol Security (IPSec) tunnel establishment procedure.

FIG. 7 shows an example of a IPSec tunnel establishment procedure. IPSec security association establishment with IKEv2 protocol is based on four-way handshake.

The initiator (for example, IAB DU 432-2) sends first IKE_SA_INIT message to responder, which is the Security GW when tunnel mode IPSec is used. The SA_INIT message contains proposed cryptographic algorithms, Diffie-Helman value and a nonce. The Security GW responses with a SA_INIT_RESPONSE message, which contains accepted cryptographic algorithms, Diffie-Helman value and responder's nonce. After the IKE_SA_INIT handshake the IKEv2 SA is encrypted, but remote peer is not authenticated.

The IKE_AUTH exchange completes the activation of the IKE security association. The initiator (for example, IAB DU 432-2), sends an IKE_AUTH request message to the Security GW (responder), containing its identity and authentication information, CHILD_SA proposals and their traffic selectors. The Security GW (responder) responses with IKE_AUTH response message, which contains Identity and Authentication info, accepted CHILD_SAs and traffic selectors.

Figure 8:
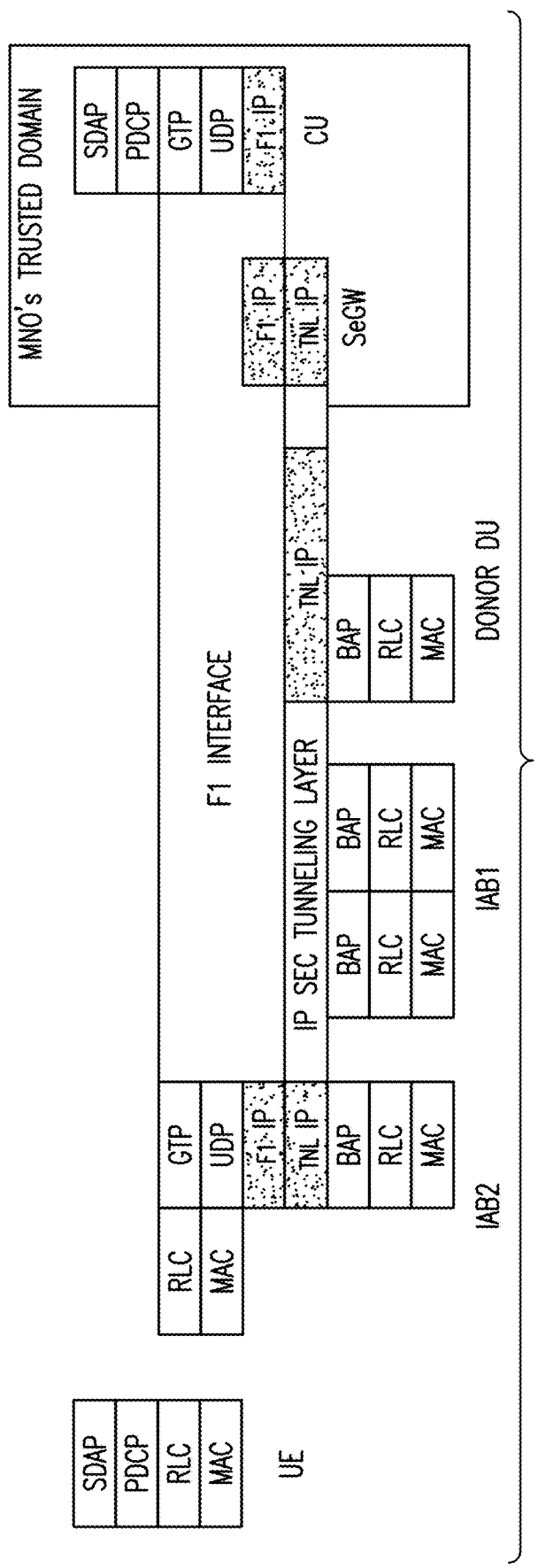
FIG. 8 shows an example IAB protocol stack with external security gateway (SEG or SeGW)

FIG. 8 illustrates a typical deployment scenario, where an F1 connection is secured between the DU and external Security GW (SEG). If the IPSec is terminated at the SEG, tunnel mode shall be used. The (inner) IP layer that is used by the DU applications, such as F1 user- and control plane applications, is encrypted by the IPSec end nodes (DU and SEG) and tunneled over the transport network layer IP (outer IP layer). The Donor DU is the first hop router of the IAB node on a TNL IP layer. The IAB node is assigned with one or more IP address(es), which is referred as outer IP address when IPSec tunnel is enabled to protect the F1 traffic. The outer IP address is anchored in the IAB-donor DU, which ensures the downlink IP traffic to the IAB node is routed to the IAB Donor DU. The IAB node may be assigned with one or more outer IP address(es) that are anchored in the IAB donor-DU. The SEG assigns the inner F1 layer IP address in a IKE handshake. The IAB node may be assigned with multiple inner IP addresses for F1-C traffic or F1-U traffic. For the uplink direction, when the IAB-DU sends the IP packet including the F1-C traffic or F1-U traffic, the inner IP address of the IAB node is used in the source address field, and the inner IP address of the IAB donor-CU is used in the destination address field. This IP packet is further encapsulated in an IPSec IP packet. Similar for downlink direction, the inner IP address of the IAB node is used in the destination address field, and the inner IP address of the IAB donor-CU is used in the source address field. The IP packet is further encapsulated in an IPSec IP packet.

The Internet Key Exchange version 2 Mobility and Multihoming Protocol (MOBIKE) is a mobility and multihoming enhancement to the Internet Key Exchange version (IKE) protocol. MOBIKE allows the IPSec client or initiator to change the outer IP address of the IPSec tunnel without re-establishment of the whole IPSec security association. When the initiator notices a change in in its own address (i.e. outer IP address in IPSec tunnel mode), the initiator informs the responder by sending an INFORMATIONAL request containing the UPDATE_SA_ADDRESSES notification. The request is sent using the new IP address. At this point, it also starts to use the new address as a source address in its own outgoing Encapsulating Security Payload (ESP) traffic. Upon receiving the UPDATE_SA_ADDRESSES notification, the responder records the new address and, if it is required by policy, performs a return routability check of the address. When this check completes, the responder starts to use the new address as the destination for its outgoing ESP traffic. With MOBIKE, the IPSec client may, for example, relocate the IPSec Security Association to a different IP interface, keeping the inner IP address used by the applications the same. MOBIKE has been proposed, but no further detail on how MOBIKE may be used for IAB topology adaptation, for example, behavior for the IAB and Donor when MOBIKE is used, has not been provided.

Figure 9:
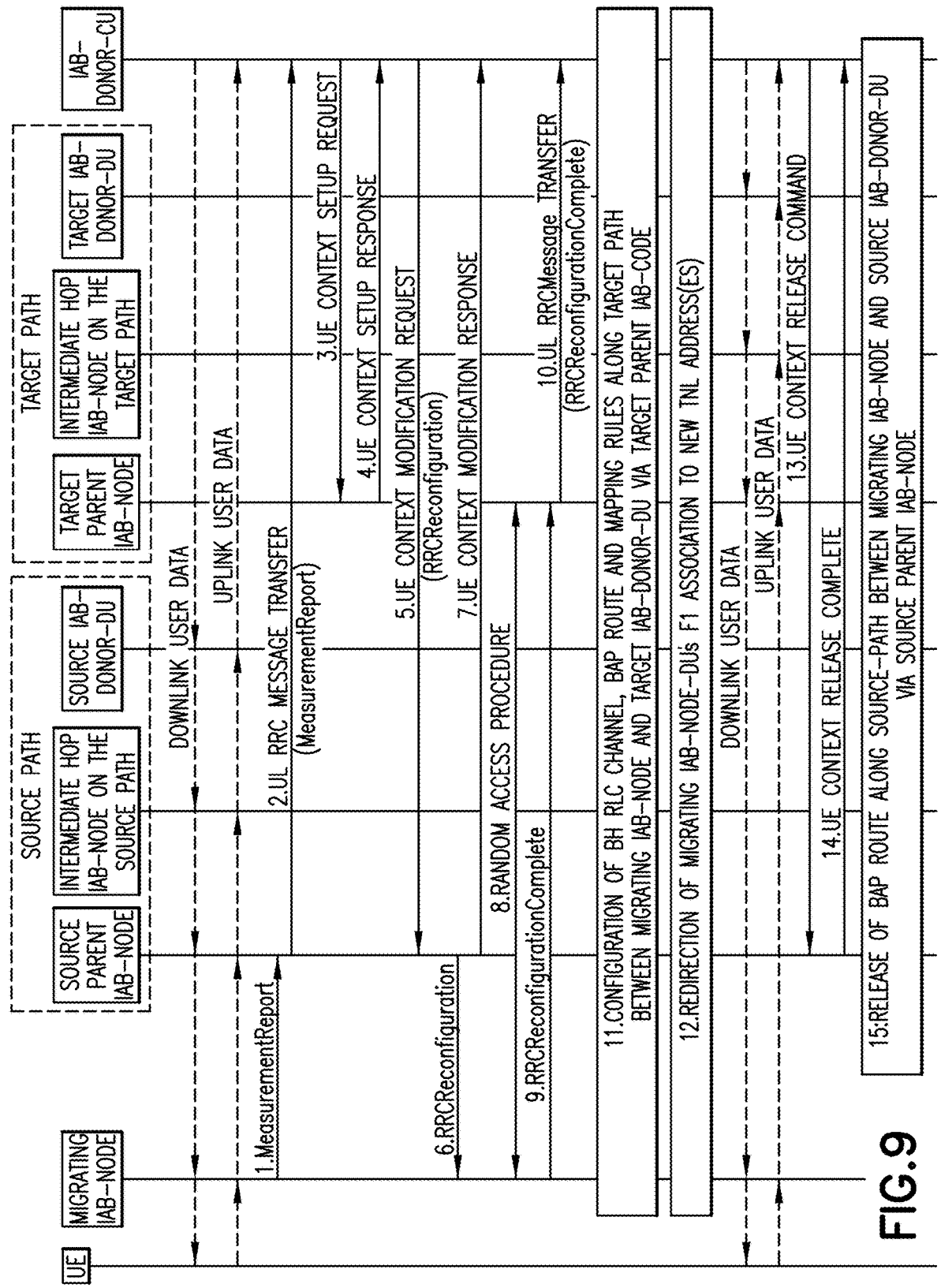
FIG. 9 shows an example signalling flow for an IAB intra-CU topology adaptation procedure.

Due to possible failure on the BH connections, or changes in the IAB topology, IAB-node may need to change its serving node which can be under the same, or different, donor DU. The Inter-Donor-DU topology adaptation may or may not cause the change of the IAB donor. Intra-Donor Topology Adaptation (TA) (also referred as Topology Migration) is supported in Rel-16, and Inter-Donor Topology Adaptation will be supported in Rel-17. A signalling flow for Rel-16 Intra-Donor Topology Adaptation in standalone deployment is shown in FIG. 9.

In Step 1, the migrating IAB-MT sends a MeasurementReport message to the source parent node IAB-DU.

In Step 2, the source parent node IAB-DU sends an UL RRC MESSAGE TRANSFER message to the IAB-donor-CU to convey the received MeasurementReport.

In Step 3, the IAB-donor-CU sends a UE CONTEXT SETUP REQUEST message to the target parent node IAB-DU to create the UE context for the migrating IAB-MT and set up one or more bearers. These bearers can be used by the migrating IAB-MT for its own signalling, and, optionally, data traffic.

In Step 4, the target parent node IAB-DU responds to the IAB-donor-CU with a UE CONTEXT SETUP RESPONSE message.

In Step 5, the IAB-donor-CU sends a UE CONTEXT MODIFICATION REQUEST message to the source parent node IAB-DU, which includes a generated RRCReconfiguration message.

In step 6 of the process shown in FIG. 8, the source parent node IAB-DU forwards the received RRCReconfiguration message to the migrating IAB-MT.

In Step 7, the source parent node IAB-DU responds to the IAB-donor-CU with the UE CONTEXT MODIFICATION RESPONSE message.

In Step 8, a Random Access procedure is performed at the target parent node IAB-DU.

In Step 9, the migrating IAB-MT responds to the target parent node IAB-DU with an RRCReconfigurationComplete message.

In Step 10, the target parent node IAB-DU sends an UL RRC MESSAGE TRANSFER message to the IAB-donor-CU to convey the received RRCReconfigurationComplete message. Also, uplink packets can be sent from the migrating IAB-MT, which are forwarded to the IAB-donor-CU through the target parent node IAB-DU. These uplink (UL) packets belong to the IAB-MT's own signalling and, optionally, data traffic.

In step 11, the IAB-donor-CU configures BH RLC channels and BAP-sublayer routing entries on the target path between the target parent IAB-node and target IAB-donor-DU as well as DL mappings on the target IAB-donor-DU for the migrating IAB-node's target path. These configurations may be performed at an earlier stage, e.g. immediately after step 3. The IAB-donor-CU may establish additional BH RLC channels to the migrating IAB-MT via RRC message.

In step 12, the F1-C connections are switched to use the migrating IAB-node's new TNL address(es), IAB-donor-CU updates the UL BH information associated to each GTP-tunnel to migrating IAB-node. This step may also update uplink (UL) Fully Qualified Tunnel Endpoint Identifier (F-TEID) and downlink (DL) Fully Qualified Tunnel Endpoint Identifier (F-TEID) associated to each GTP-tunnel. All F1-U tunnels are switched to use the migrating IAB-node's new TNL address(es). This step may use non-UE associated signaling in E1 and/or F1 interface to provide updated UP configuration for F1-U tunnels of multiple connected UEs or child IAB-MTs. The IAB-donor-CU may also update the UL BH information associated with non-UP traffic. Implementation must ensure the avoidance of potential race conditions, i.e. no conflicting configurations are concurrently performed using UE-associated and non-UE-associated procedures.

In Step 13, the IAB-donor-CU sends a UE CONTEXT RELEASE COMMAND message to the source parent node IAB-DU.

In Step 14, the source parent node IAB-DU releases the migrating IAB-MT's context and responds to the IAB-donor-CU with a UE CONTEXT RELEASE COMPLETE message.

In Step 15, the IAB-donor-CU releases BH RLC channels and BAP-sublayer routing entries on the source path between source parent IAB-node and source IAB-donor-DU.

The outer IP address used by the IAB node for IPSec tunnel is anchored in (or assigned by) the Donor-DU. During the inter-Donor-DU topology adaptation, the IAB node will be assigned with the new outer IP address(es) that is anchored in target Donor DU.

When the Donor-DU is changed during the Topology Adaptation there may be an interruption in service. This includes the Intra-Donor Topology Adaptation (Rel-16) and Inter-Donor Topology Adaptation (Rel-17). The below description uses intra-Donor inter-Donor-DU Topology Adaptation as an example.

Referring to FIG. 9, in step 6 upon the reception of the RRCReconfiguration message, the IAB-MT detaches from source parent cell. The F1-U between the Donor-CU-UP and the IAB-DU is stopped. The Donor-CU-CP may inform the Donor-CU-UP to stop the DL F1-U transmission at step 5.

Step 12 of FIG. 9 contains multiple sub-steps.

In step 12*a*: IAB initiates IPSec establishment using the new outer IP address (anchored in target Donor-DU) and get a new inner IP address. This is a 4-way handshake.

In step 12*b*, IAB-DU initiates SCTP setup using the new inner IP address. This is a 4-way handshake.

In step 12*c*, IAB-DU initiates F1AP DU Configuration Update to inform CU-CP to use the new SCTP association. F1-C is now switched to target path. This is a 2-way handshake.

In step 12*d*, CU-CP initiates IAB UP Configuration Update procedure. IAB-DU provide the new (inner) IP address for F1-U. This is a 2-way handshake.

In step 12*e*, CU-CP informs CU-UP for the new IP address for F1-U. this is a 2-way handshake.

F1-U is now switched to target path. The F1-C and F1-U transmission can be resumed after Step 12*e*. In total, step 12 has a 14-way handshake.

In summary, the F1-C and F1-U transmission is stopped after Step 5 and can only be resumed after Step 12. The main interruption is caused by the 2 4-way handshakes used in IPSec establishment and new SCTP establishment.

One of the objectives in Rel-17 is to reduce signalling load. Topology adaptation enhancements are for the specification of procedures for inter-donor IAB-node migration to enhance robustness and load-balancing, including enhancements to reduce signalling load.

Multiple proposals have been proposed to reduce signaling load on XnAP interface and F1AP interface. Providing a new outer IP address and other configuration to the migrating IAB during the handover preparation procedure has been proposed.

FIG. 10 shows a flowchart of a method according to an example embodiment where a relay node is performing a topology adaptation, which causes a change of the communication path between the IAB DU and the donor CU from a first communication path comprising a first donor DU and optionally one or more at least one intermediate IAB node, to a second communication path including a second donor-DU and optionally one or more at least one intermediate IAB node. In the example embodiment, a relay node such as an IAB node (for example, IAB node 430-2) is in communication with a donor node such as an IAB donor, for example, via a first donor-DU (e.g. first IAB donor-DU) and optionally one or more intermediate IAB node(s). As described above, the relay node is assigned with one or more outer IP address(es) anchored in the first donor-DU. Accordingly, the relay node is assigned with one or more inner IP address(es) to be used for F1-C interface and F1-U interface.

In a first step, S1, the method comprises at a distributed unit of a relay node, determining that an IP address(es) of the distributed unit of the relay node used for communicating with a centralised unit of a donor node over a first communication path comprising a first donor DU and optionally one or more at least one intermediate IAB node is (are) to be reused after a change of the communication path between the IAB DU and the donor CU from the first communication path to a second communication path including a second donor-DU.

In a second step, S2, the method comprises providing an indication to the control plane of the centralised unit of the donor node that the IP address(es) is (are) to be reused, for example, for the F1-C interface and/or the F1-U interface.

Figure 11:
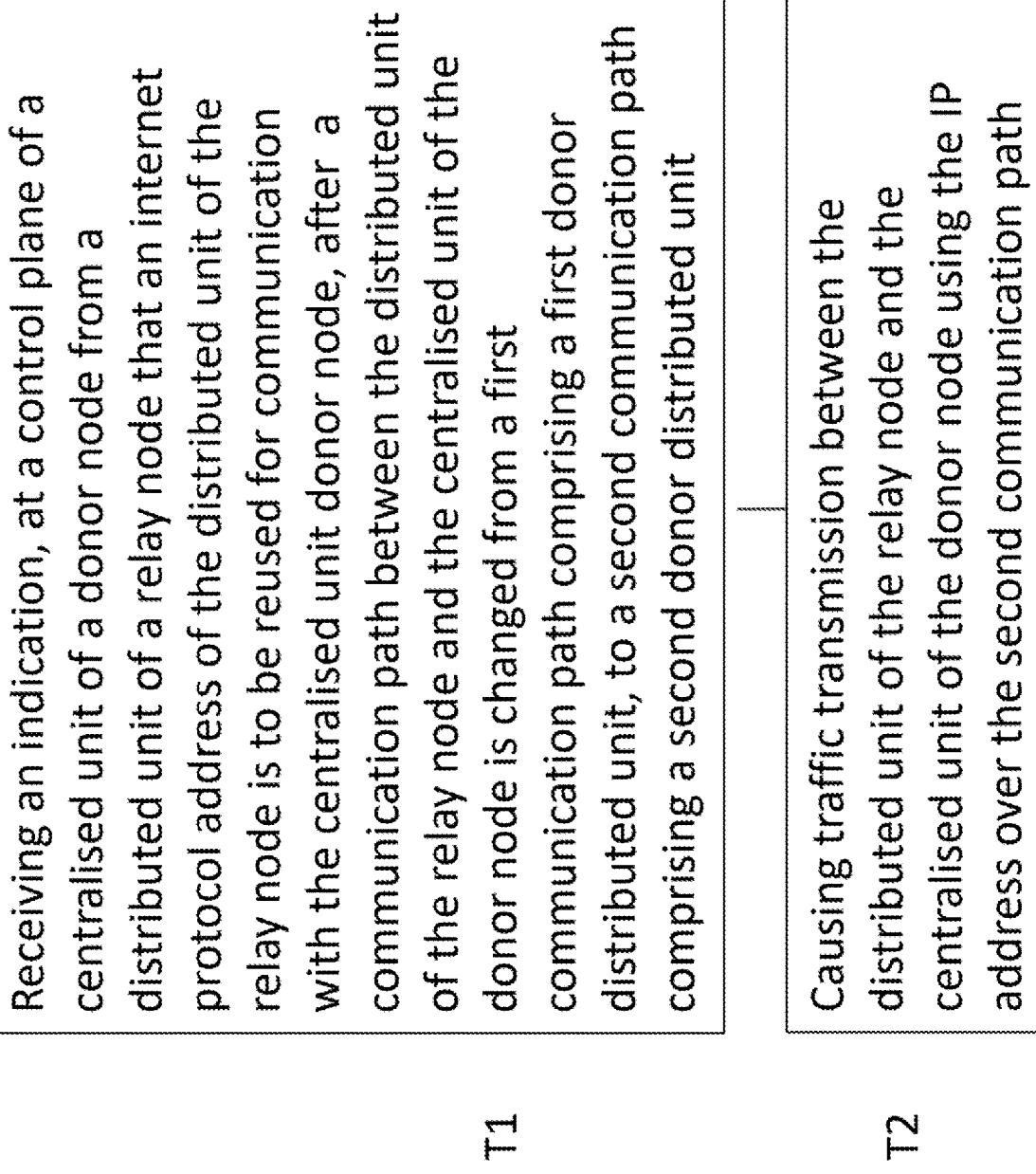
FIG. 11 shows a flowchart of a method according to an example embodiment.

FIG. 11 shows a flowchart of a method according to an example embodiment. In a first step, T1, the method comprises receiving an indication, at a centralised unit of a donor node of a network from a distributed unit of a relay node that an IP address of the distributed unit of the relay node is to be reused after a communication path between the distributed unit of the relay node and the centralised unit of the donor node is changed from a first communication path including a first donor distributed unit to a second communication path including a second donor distributed unit.

In a second step, T2, the method comprises causing traffic transmission between the centralised unit of the donor node and the distributed unit of the relay node using the IP address over the second communication path.

Determining that the inner IP address (which may also be referred to as an address of a first layer) between the distributed unit of an relay node and the centralised unit of the donor node is to be reused may comprise determining that the relay node is assigned with a new IP address anchored in the second donor distributed unit (also referred as outer address, or address of second layer) and a mobility internet key exchange (e.g., Internet Key Exchange version 2 Mobility and Multihoming Protocol (MOBIKE)) procedure to protect the traffic between the distributed unit and the centralised unit of the donor node has been performed (for example, between the IAB node and the security gateway), after the communication path is changed to the second communication path (e.g., after an inter-Donor-DU topology adaptation).

The first layer may be an internet protocol layer terminated at the IAB node and the IAB donor CU, and may be referred to as an inner IP layer. The IP address related to the first layer or inner IP layer is referred to as inner IP address. The second layer may be an internet protocol layer terminated at the IAB node and an security gateway, and may be referred to as an outer IP layer. The IP address related to the second layer or outer IP layer is referred to as outer IP address.

The indication may be provided in a configuration update message, or any other messages. For example, the indication may be sent via the F1 Application Protocol gNB-DU CONFIGURATION UPDATE message.

In an example embodiment, an IAB node determines whether to indicate to a Donor-CU-CP that the inner IP address of the F1-C/U association is reused after topology adaptation (TA). The determination is based on whether the IAB node is assigned with a new outer IP address anchored in the target Donor DU (or whether outer IP address is changed) and, if the outer IP address is changed and the IAB-DU initiates the MOBIKE procedure to update the outer IP address for the IPSec tunnel, whether the MOBIKE procedure is successfully performed.

That is the condition to send the indication is determined to be valid when the outer IP address is changed, and the MOBIKE procedure is successfully performed. When this condition is valid, the IAB-DU indicates to the IAB-donor-CU-CP that the inner IP address is reused after the topology adaptation.

In an example embodiment, the IAB-donor-CU-CP receives the indication from the IAB-node that the inner IP address of the F1-C/U association is reused after the topology adaptation. In one example embodiment, the IAB-donor may stop or suspend the F1-C traffic transmission before the IAB node performs migration, the IAB donor-CU-CP then resumes the F1-C traffic transmission reusing the previous inner IP address towards the IAB node over the second communication path after the IAB donor-CU-CP receives the indication. The IAB-donor may stop or suspend the F1-U traffic transmission before the IAB node performs migration, the IAB donor-CU-CP may also inform the IAB donor CU-UP to resume the F1-U traffic reusing the previous inner IP address towards the IAB node over the second communication path. In another example embodiment, the IAB donor-CU-CP may initiate the handover procedure for the UE or the descendant IAB connected with the migrating IAB node, in order to migrate the F1 traffic to the second communication path.

In the case of inter-Donor Topology adaptation, the IAB donor may initiate the handover procedure or retrieve UE context procedure for the UE or the descendant IAB connected with the migrating IAB node to target IAB donor. In one example embodiment, when the source IAB donor receive the indication (for example, the IAB donor 210 receive the indication from IAB-DU 242-1 in FIG. 5*b*), the method may comprise a source IAB-donor-CU-CP (for example, the CU-CP 213) initiating the handover procedure for the UE(s)/descendant IAB node(s), in order to handover the UE(s)/descendant IAB nodes to a target Donor. In another example embodiment, when the target IAB donor receive the indication (for example, the IAB donor 220 receive the indication from IAB-DU 242-2 in FIG. 5*b*), the method may comprise a target IAB-donor-CU-CP (for example, the CU-CP 223) requesting the Source Donor to initiate the handover procedure for the UE/descendant IAB-node or retrieve the context for the UE/descendant IAB node from the source donor.

The method may comprise causing transmission to the centralised unit of the donor node using the address of the first layer over the second communication path comprising the target donor DU and optionally one or more intermediate IAB node. For example, the IAB-DU may resume the F1-C/U transmission using the existing inner IP address over the target path/target IPSec tunnel.

The method of FIG. 11 may comprise the centralised unit of the donor node communicating with the distributed unit of the relay node using the address of the first layer and/or providing an indication to the user plane of the centralised unit to communicate reusing the address of the first layer. For example, the IAB-donor-CU-CP may resume the F1-C operation reusing the existing inner IP address of the IAB node, and/or inform the IAB-donor-CU-UP to resume the F1-U operation reusing the existing inner IP address of the IAB node.

An example embodiment is now described with reference to FIG. 9. In step 12*a*, the IAB-node checks whether the outer IP address is changed. The Outer IP address may be received in the RRCReconfiguration message in Step 6.

If the outer IP address is not changed, existing Intra-Donor-DU Topology Adaptation procedure is applied.

If the outer IP address is changed, the IAB initiates MOBIKE procedure (2-way handshake). If the MOBIKE procedure is unsuccessful, existing Inter-Donor-DU Topology adaptation procedure is applied.

If the MOBIKE procedure is successfully performed, the existing inner IP address for F1-C/U may be reused after the topology adaptation.

In this case, Step 12*b* "new SCTP setup" may be avoided, thus saving the 4-way handshake.

In step 12*c*, the IAB-DU initiates a F1AP procedure to inform the CU that the inner IP address is reused (i.e. providing the indication) and F1-C/U can be resumed via current SCTP association and F1-U tunnel which involves a 2-way handshake.

Step 12*d* described above where IAB-DU provides the new (inner) IP address for F1-U may be avoided, thus saving the 2-way handshake.

In step 12*e*, the CU-CP informs the CU-UP to resume DL F1-U transmission in a 2-way handshake.

The F1-C and F1-U transmission is now resumed.

In a summary, as shown in Table 1, the original 14-way handshake in Step 12 is now reduced to 6-way handshake.

TABLE 1

|  | Procedures without MOBIKE | Procedures with MOBIKE and above proposals |
| --- | --- | --- |
| 12a: | 4-way IP Sec establishment | 2-way MOBIKE handshake |
| 12b: | 4-way SCTP Setup | 0-way: NOT NEEDED |
| 12c: | 2-way F1AP DU Config update | 2-way F1AP DU Config update |
| 12d: | 2-way F1AP UP Config update | 0-way: NOT NEEDED |
| 12e: | 2-way new IP Addr for F1-U | 2-way resume DL F1-U transmission |
| TOTAL | 14 steps | 6 steps |

The method may also be used in Inter-Donor Topology Adaptation. Two examples are given below depend on whether the IAB-DU send the indication to Source Donor or to Target Donor.

Figure 12:
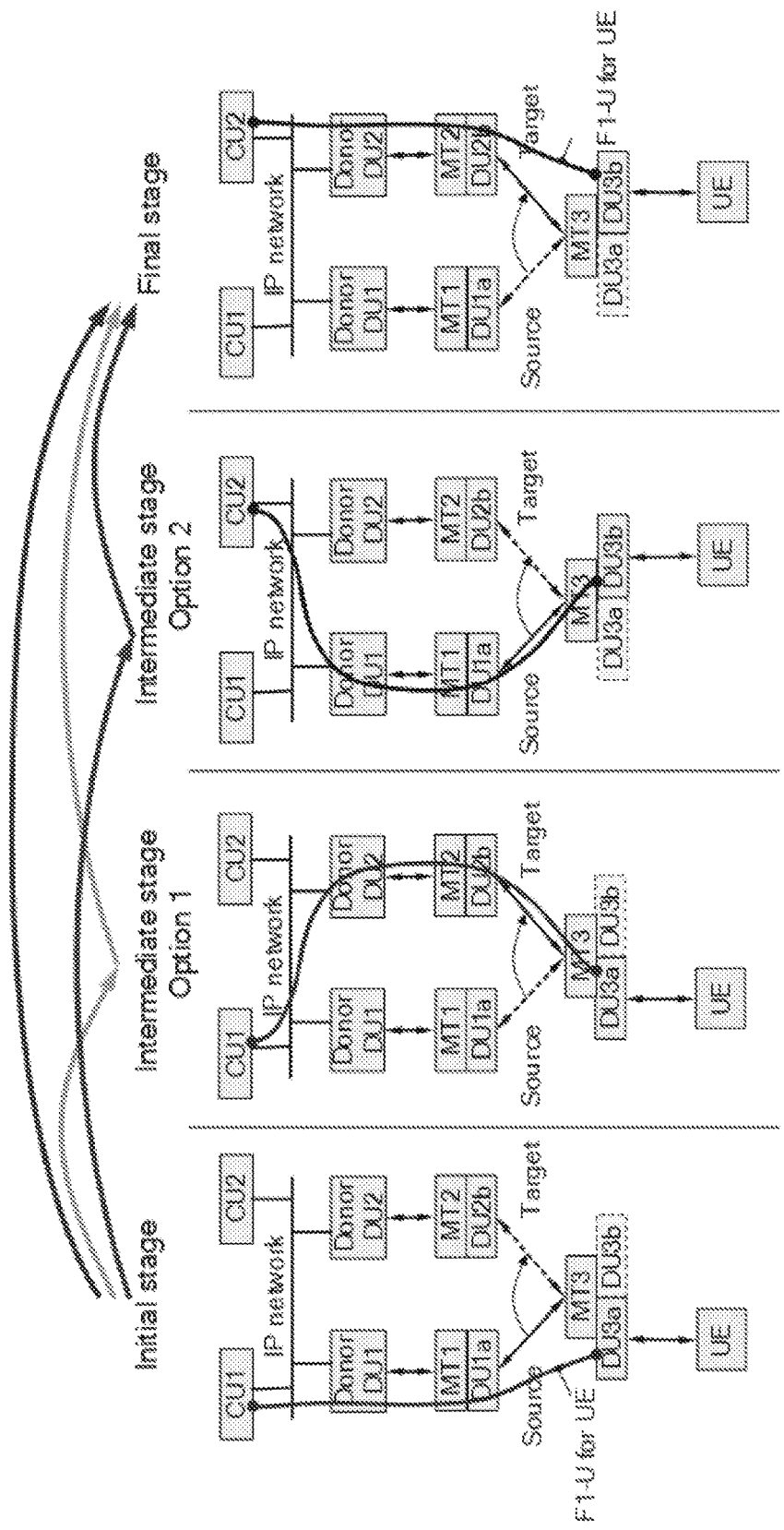
FIG. 12 shows a schematic diagram of an example Inter-CU (inter-donor) topology adaptation procedure.

FIG. 12 shows an example of an Inter-Donor adaptation procedure is (based on the assumption that an IAB node has dual DU, e.g. DU3*a* and DU3*b* in FIG. 12)

In a first option, the IAB-MT is first handed over to the target node (under the topology of the target donor) and the "source" F1-C between CU1 and DU3*a* is moved to target path ("Intermediate stage Option 1" in FIG. 12).

After the IAB-MT has completed the HO to target Donor (i.e. CU2), IAB-DU3*a* initiates MOBIKE procedure to update the IPSec tunnel outer IP address. After the MOBIKE procedure is successfully performed, the IAB-DU3*a* can reuse the existing inner IP address and skip the new SCTP setup. DU3*a* send the indication to CU1, indicating the F1-C/U can reuse existing inner IP address and are ready over target path. CU1 starts the HO preparation for the UE and descendant IABs connected to the migration IAB.

In a second option, ("Intermediate stage Option 2" in FIG. 12), DU3*b* establishes SCTP/F1 with CU2 over source path (referred as "Target" F1-C) before the handover procedure for the IAB-MT. The IAB-MT then performs HO to target node and the "target" F1-C between CU2 and DU3*b* is then moved to target path. In this example, the DU3*b* may send the indication to CU2, CU2 then initiates the XnAP context retrieve procedure from CU1 for the connected UE and descendant IAB or CU2 may request CU1 to initiate the HO procedure for the connected UE and descendant IAB.

In both examples, an indication is provided to the Donor-CU-CP (i.e. Source Donor-CU-CP in Option 1, or Target Donor-CU-CP in Option 2) indicating the existing inner IP address may be reused for F1-C/U, thus the HO for the UE and descendant IAB can be started. Without this indication, the Donor-CU-CP (i.e. Source Donor-CU-CP in Option 1 or Target Donor-CU-CP in Option 2) may not know when the F1-C/U (i.e. Source F1-C/U in Option 1, and Target F1-C/U in Option 2) is ready for initiating the HO preparation for the UE/descendant IAB. As a result, it would not be possible to take the benefit of MOBIKE and reduce the service interruption during the Topology Adaptation.

This method described above may reduce the two 4-way handshakes, thus reducing the service interruption during the inter-Donor-DU topology adaptation (for both intra-Donor topology adaptation and inter-Donor topology adaptation).

The method may be implemented at a control apparatus as described with reference to FIG. 3.

An apparatus may comprise means for, at a distributed unit of a relay node, determining that an internet protocol, IP, address of the distributed unit of the relay node used for communicating with a centralised unit of a donor node over a first communication path comprising a first donor distributed unit is to be reused after a change from the first communication path to a second communication path comprising a second donor distributed unit and providing an indication to the control plane of the centralised unit of the donor node that the IP address is to be reused.

Alternatively, or in addition, an apparatus may comprise means for receiving an indication, at a control plane of a centralised unit of a donor node from a distributed unit of a relay node that an internet protocol address of the distributed unit of the relay node is to be reused for communication with the centralised unit donor node, after a communication path between the distributed unit of the relay node and the centralised unit of the donor node is changed from a first communication path comprising a first donor distributed unit, to a second communication path comprising a second donor distributed unit and causing traffic transmission between the distributed unit of the relay node and the centralised unit of the donor node using the IP address over the second communication path.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5G NR, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

What is claimed is:

1. An apparatus, comprising:
   at least one processor; and
   at least one non-transitory memory storing instructions that, when executed with the at least one processor, cause the apparatus to perform, at a distributed unit of a relay node:
   determining that an internet protocol, address of the distributed unit of the relay node used for communicating with a centralized unit of a donor node over a first communication path comprising a first donor distributed unit is reused after a change from the first communication path to a second communication path comprising a second donor distributed unit; and providing an indication to the control plane of the centralized unit of the donor node that the internet protocol address is to be reused;

wherein the instructions, when executed with the at least one processor, cause the apparatus to provide the indication in a F1 application protocol distributed unit configuration update message.

2. An apparatus according to claim 1, wherein the internet protocol address is an inner internet protocol address when internet protocol security tunnel mode is used to protect the traffic between the distributed unit of the relay node and the centralized unit of the donor node.

3. An apparatus according to claim 1, wherein the instructions, when executed with the at least one processor, cause the distributed unit of the relay node to use the internet protocol address with a first outer internet protocol address anchored in the first donor distributed unit, when the distributed unit of the relay node is in communication with the centralized unit of the donor node over the first communication path.

4. An apparatus according to claim 1, wherein the instructions, when executed with the at least one processor, cause the distributed unit of the relay node to use the internet protocol address with a second outer internet protocol address anchored in the second donor distributed unit, when the distributed unit of the relay node is in communication with the centralized unit of the donor node over the second communication path.

5. An apparatus according to claim 1, wherein the instructions, when executed with the at least one processor cause the apparatus to determine that the relay node is assigned with a new outer internet protocol address anchored in the second donor distributed unit and a mobility internet key exchange procedure to protect the traffic between the distributed unit and the centralized unit of the donor node has been performed, after the communication path is changed to the second communication path.

6. An apparatus according to claim 1, wherein the instructions, when executed with the at least one processor, cause the transmission of the indication to the centralized unit of the donor node using the internet protocol address over the second communication path comprising the second donor distributed unit.

7. An apparatus, comprising means for:
at least one processor; and
at least one memory storing instructions that, when executed with the at least one processor, cause the apparatus to perform:
receiving an indication, at a control plane of a centralized unit of a donor node from a distributed unit of a relay node that an internet protocol address of the distributed unit of the relay node is to be reused for communication with the centralized unit donor node,
after a communication path between the distributed unit of the relay node and the centralized unit of the donor node is changed from a first communication path comprising
a first donor distributed unit, to a second communication path comprising a second donor distributed unit; and
causing traffic transmission between the distributed unit of the relay node and the centralized unit of the donor node using the internet protocol address over the second communication path;

wherein the indication is received in a F1 application protocol distributed unit configuration update message.

8. An apparatus according to claim 7, wherein the internet protocol address is the inner internet protocol address when, internet protocol security tunnel mode is used to protect the traffic between the distributed unit of the relay node and the centralized unit of the donor node.

9. An apparatus according to claim 7, wherein the instructions, when executed with the at least one processor, cause the distributed unit of the relay node to use the internet protocol address with a first outer internet protocol address anchored in the first donor distributed unit, when the distributed unit of the relay node is in communication with the centralized unit of the donor node over the first communication path.

10. An apparatus according to claim 7, wherein the instructions, when executed with the at least one processor, cause the distributed unit of the relay mode to use the internet protocol address with a second outer internet protocol address anchored in the second donor distributed unit, when the distributed unit of the relay node is in communication with the centralized unit of the donor node over the second communication path.

11. An apparatus according to claim 7, wherein the instructions, when executed with the at least one processor, cause the apparatus to initiate a handover procedure or a retrieve user equipment context procedure for a user equipment or a descendant relay node, to use the second communication path.

12. An apparatus according to claim 7, wherein the instructions, when executed with the at least one processor, cause the apparatus to provide an indication to the user plane of the centralized unit of the donor node to resume the traffic transmission using the internet protocol address of the distributed unit of the relay node.

13. A method, comprising:
at a distributed unit of a relay node,
determining that an internet protocol, IP, address of the distributed unit of the relay node used for communicating with a centralized unit of a donor node over a first communication path comprising
a first donor distributed unit is to be reused
after a change from the first communication path to a second communication path comprising a second donor distributed unit; and
providing an indication to the control plane of the centralized unit of the donor node that the internet protocol address is to be reused;
wherein the indication is provided in a F1 application protocol distributed unit configuration update message.

14. A non-transitory program storage device readable with an apparatus, tangibly embodying a program of instructions executable with the apparatus for performing the method of claim 13.

15. A method, comprising:
receiving an indication, at a control plane of a centralized unit of a donor node from a distributed unit of a relay node that an internet protocol address of the distributed unit of the relay node is reused for communication with the centralized unit donor node,
after a communication path between the distributed unit of the relay node and the centralized unit of the donor node is changed from a first communication path comprising a first donor distributed unit, to a second communication path comprising a second donor distributed unit; and causing traffic transmission between the distributed unit of the relay node and the centralized unit of the donor node using the IP address over the second communication path;

wherein the indication is received in a F1 application protocol distributed unit configuration update message.

16. A non-transitory program storage device readable with an apparatus, tangibly embodying a program of instructions executable with the apparatus for performing the method of claim 15.

\* \* \* \* \*